United States Patent
Ino et al.

(10) Patent No.: US 8,988,581 B2
(45) Date of Patent: Mar. 24, 2015

(54) IMAGE PICKUP APPARATUS AND CONTROL METHOD THEREOF

(75) Inventors: Kazuya Ino, Yokohama (JP); Ken Terasawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 13/882,931

(22) PCT Filed: Nov. 25, 2011

(86) PCT No.: PCT/JP2011/077876
§ 371 (c)(1),
(2), (4) Date: May 1, 2013

(87) PCT Pub. No.: WO2012/074079
PCT Pub. Date: Jun. 7, 2012

(65) Prior Publication Data
US 2013/0215318 A1    Aug. 22, 2013

(30) Foreign Application Priority Data

Nov. 30, 2010  (JP) ................. 2010-266972
Nov. 14, 2011  (JP) ................. 2011-248729

(51) Int. Cl.
H04N 5/225   (2006.01)
G02B 13/16   (2006.01)
H04N 5/232   (2006.01)
H04N 5/357   (2011.01)

(52) U.S. Cl.
CPC ............. H04N 5/232 (2013.01); H04N 5/3572 (2013.01)
USPC ....................................................... 348/335

(58) Field of Classification Search
CPC ............................ H04N 5/357; H04N 5/3572
USPC ....................................................... 348/335
See application file for complete search history.

(56) References Cited

U.S. PATENT DOCUMENTS

| 5,818,527 A * | 10/1998 | Yamaguchi et al. .......... 348/335 |
| 6,323,934 B1 | 11/2001 | Enomoto ......................... 355/40 |
| 2003/0174886 A1* | 9/2003 | Iguchi et al. .................. 382/167 |
| 2009/0297060 A1* | 12/2009 | Hattori ........................... 382/275 |
| 2010/0073526 A1* | 3/2010 | Watanabe et al. ............. 348/247 |
| 2010/0208095 A1* | 8/2010 | Sugimori ................... 348/222.1 |
| 2011/0206359 A1* | 8/2011 | Nishimura et al. ............ 396/111 |
| 2013/0076938 A1* | 3/2013 | Kano .......................... 348/224.1 |

FOREIGN PATENT DOCUMENTS

| JP | H11-225270 | 8/1999 |
| JP | 2002-190979 | 7/2002 |
| JP | 2007-174472 | 7/2007 |
| JP | 2009-303114 | 12/2009 |
| JP | 2010-103935 | 5/2010 |
| JP | 2011-205231 | 10/2011 |

* cited by examiner

Primary Examiner — Roberto Velez
Assistant Examiner — Tuan Le
(74) Attorney, Agent, or Firm — Fitzpatrick, Cella, Harper & Scinto

(57) ABSTRACT

An image pickup apparatus capable of highly efficiently realizing optical corrections of various aberrations while reducing the load imposed on a central processing unit (CPU). A plurality of optical correction units apply optical correction processes to a plurality of aberrations in an optical system. A time period assigned for the optical correction processes and a time period required for the optical correction processes are acquired. Priorities of the plurality of optical correction units are decided if the time period required for the optical correction processes is longer than the time period assigned for the optical correction processes. The plurality of optical correction units execute the optical correction processes according to the decided priorities.

9 Claims, 5 Drawing Sheets

FIG. 4

| PRIORITY No. | LIGHT FALLOFF | MAGNIFICATION CHROMATIC ABERRATION | DISTORTION |
|---|---|---|---|
| 1 | LARGE(③) | LARGE(①) | LARGE(②) |
| 2 | MEDIUM(③) | MEDIUM(①) | MEDIUM(②) |
| 3 | SMALL(③) | SMALL(①) | SMALL(②) |
| 4 | LARGE(①) | MEDIUM(②) | MEDIUM(③) |
| 5 | LARGE(①) | SMALL(②) | SMALL(③) |
| 6 | MEDIUM(①) | SMALL(②) | SMALL(③) |
| 7 | MEDIUM(③) | LARGE(①) | MEDIUM(②) |
| 8 | SMALL(③) | LARGE(①) | SMALL(②) |
| 9 | SMALL(③) | MEDIUM(①) | SMALL(②) |
| 10 | MEDIUM(③) | MEDIUM(②) | LARGE(①) |
| 11 | SMALL(③) | SMALL(②) | LARGE(①) |
| 12 | SMALL(③) | SMALL(②) | MEDIUM(①) |
| 13 | SMALL(③) | LARGE(①) | LARGE(②) |
| 14 | MEDIUM(③) | LARGE(①) | LARGE(②) |
| 15 | SMALL(③) | MEDIUM(①) | MEDIUM(②) |
| 16 | LARGE(②) | SMALL(③) | LARGE(①) |
| 17 | LARGE(②) | MEDIUM(③) | LARGE(①) |
| 18 | MEDIUM(②) | SMALL(③) | MEDIUM(①) |
| 19 | LARGE(②) | LARGE(①) | SMALL(③) |
| 20 | LARGE(②) | LARGE(①) | MEDIUM(③) |
| 21 | MEDIUM(②) | MEDIUM(①) | SMALL(③) |
| 22 | LARGE(①) | MEDIUM(②) | SMALL(③) |
| 23 | LARGE(①) | SMALL(③) | MEDIUM(②) |
| 24 | MEDIUM(②) | LARGE(①) | SMALL(③) |
| 25 | SMALL(③) | LARGE(①) | MEDIUM(②) |
| 26 | MEDIUM(②) | SMALL(③) | LARGE(①) |
| 27 | SMALL(③) | MEDIUM(②) | LARGE(①) |

IMAGE PICKUP APPARATUS AND CONTROL METHOD THEREOF

TECHNICAL FIELD

The present invention relates to an image pickup apparatus and a control method thereof, and more particularly, relates to an image pickup apparatus, which is capable of realizing optical corrections of various aberrations in lenses, and a control method thereof.

BACKGROUND ART

In general, a lens has various aberrations, such as chromatic aberration, distortion, peripheral light falloff, and blurring, attributed to the characteristics of the lens, which leads to degradation in the image quality. Moreover, it is known that various aberrations change according to the focal length, the aperture, and the focus position (hereinafter referred to as "the optical parameters") as well as the distance from the optical axis center of the lens.

Therefore, a conventional image pickup apparatus includes a memory in which the characteristics of the lens are stored in advance for each optical parameter. The image pickup apparatus reads out the lens characteristics from the memory according to set optical parameters and executes optical correction processes of various aberrations based on the lens characteristics. If the lens characteristics corresponding to the set optical parameters are not stored in the memory, the lens characteristics are generated as the neighborhood lens characteristics by using the interpolation method (For example, see PTL1).

CITATION LIST

Patent Literature

{PTL1} Japanese Laid-Open Patent Publication (Kokai) No. H11-225270

SUMMARY OF INVENTION

Technical Problem

However, the above-mentioned optical correction processes of various aberrations increases the calculation load, thereby increasing the load imposed on the CPU.

Accordingly, the optical correction processes of various aberrations are realized if the load imposed on the CPU by other processes is low during real-time processing of video images, whereas the time that can be spent for the optical correction processes of various aberrations may be shortened if the load imposed on the CPU by other processes is high during real-time processing of video images, which disables all the optical correction processes to be completed in each frame image of the video images.

As a result, when the load imposed on the CPU by other processes is high in real-time processing of video images, executing the optical correction processes of various aberrations in a fixed order, for example, may allow only a part of the optical correction processes to be executed without the other optical correction processes maintained, which may disable the expected correction advantages to be attained.

Solution to Problem

The present invention provides an image pickup apparatus which is capable of highly efficiently realizing optical corrections of various aberrations while reducing the load imposed on a central processing unit (CPU), and a control method thereof.

According to a first aspect of the present invention, there is provided an image pickup apparatus comprising an optical system, the image pickup apparatus comprising: a plurality of optical correction units that apply optical correction processes to a plurality of aberrations in the optical system, respectively; a first acquisition unit that acquires a time period assigned for the optical correction processes; a second acquisition unit that acquires a time period required for the optical correction processes; a determination unit that determines whether or not the time period required for the optical correction processes is longer than the time period assigned for the optical correction processes; a decision unit that decides priorities of the plurality of optical correction units if the time period required for the optical correction processes is longer than the time period assigned for the optical correction processes; and an optical correction execution unit that causes the plurality of optical correction units to execute the optical correction processes according to the decided priorities.

According to a second aspect of the present invention, there is provided a control method of an image pickup apparatus comprising an optical system, respectively, the control method comprising: a plurality of optical correction steps of applying optical correction processes to a plurality of aberrations in the optical system; a first acquisition step of acquiring a time period assigned for the optical correction processes; a second acquisition step of acquiring a time period required for the optical correction processes; a determination step of determining whether or not the time period required for the optical correction processes is longer than the time period assigned for the optical correction processes; a decision step of deciding priorities of the plurality of optical correction steps if the time period required for the optical correction processes is longer than the time period assigned for the optical correction processes; and an optical correction execution step of causing the optical correction processes to be executed in the plurality of optical correction steps according to the decided priorities.

According to the present invention, it is possible to improve the efficiency of optical correction processes of various aberrations while reducing the load imposed on a central processing unit (CPU) during real-time processing of video images.

Further features of the present invention will become apparent from the following description of an exemplary embodiment with reference to the attached drawings.

BRIEF DESCRIPTION OF DRAWINGS

FIG. 4 A table which is useful in explaining the manner of the optical correction adjustment unit providing priorities referred to in step S206 of FIG. 3.

DESCRIPTIONS OF EMBODIMENTS

The present invention will now be described in detail below with reference to the drawings showing preferred embodiments thereof.

Figure 1:
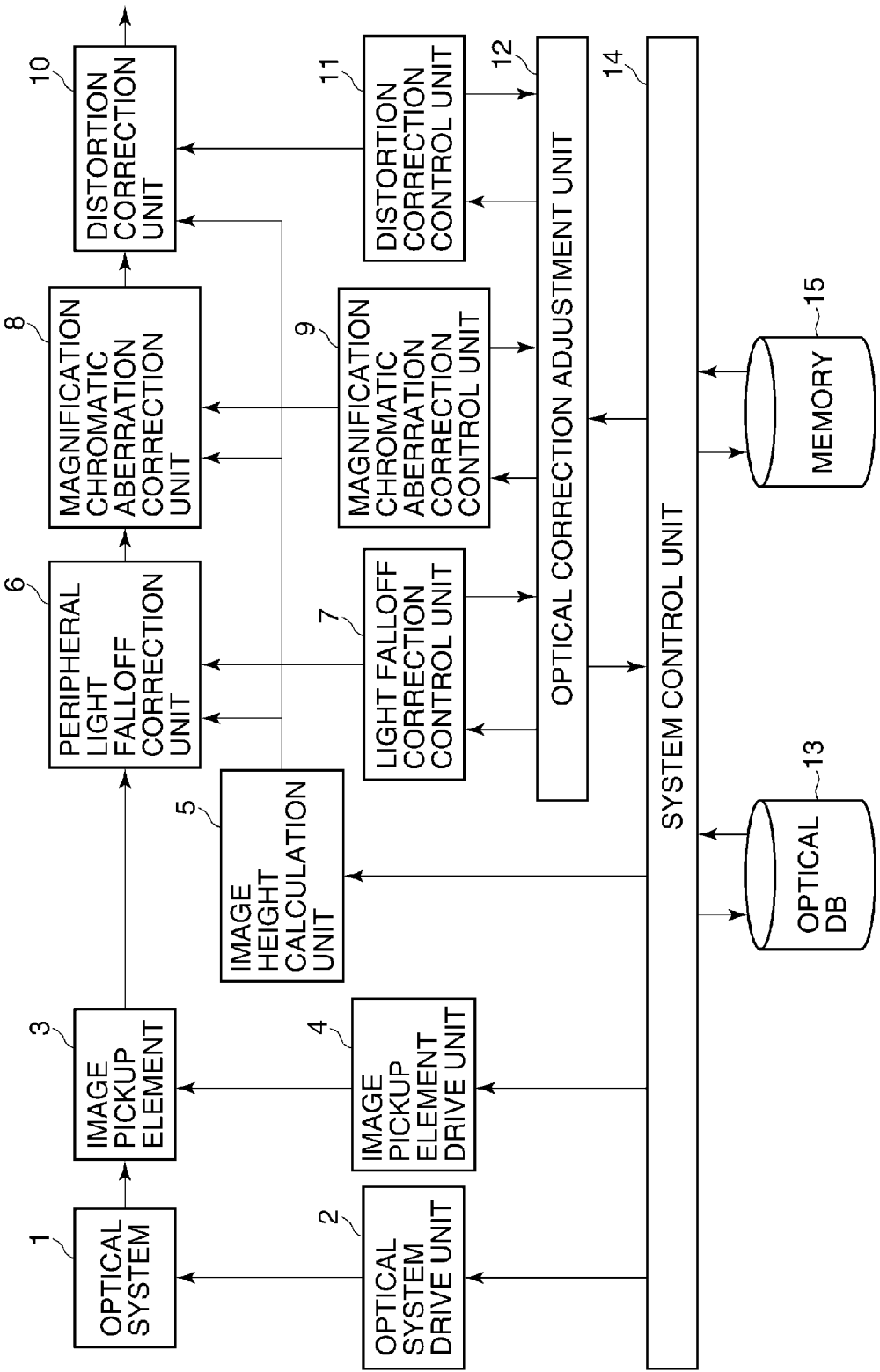
FIG. 1 A block diagram schematically showing an internal configuration of an image pickup apparatus according to an embodiment of the present invention.

FIG. 1 is a block diagram schematically showing an internal configuration of an image pickup apparatus according to an embodiment of the present invention.

In FIG. 1, the image pickup apparatus according to the embodiment of the present invention comprises: an optical system 1 including a zoom lens, a focus lens, an aperture, etc.; an optical system drive unit 2 that drives the optical system 1; an image pickup element 3; an image pickup element drive unit 4 that drives the image pickup element 3; an image height calculation unit 5 that calculates a distance from the optical axis center of the optical system 1; a peripheral light falloff correction unit 6 that corrects a peripheral light falloff; a light falloff correction control unit 7 that controls the peripheral light falloff correction unit 6; a magnification chromatic aberration correction unit 8 that corrects a magnification chromatic aberration; a magnification chromatic aberration correction control unit 9 that controls the magnification chromatic aberration correction unit 8; a distortion correction unit 10 that corrects a distortion; a distortion correction control unit 11 that controls the distortion correction unit 10; and an optical correction adjustment unit 12 that adjusts the light falloff correction control unit 7, the magnification chromatic aberration correction control unit 9, and the distortion correction control unit 11.

The image pickup apparatus of FIG. 1 further includes: a system control unit 14 that is connected to the optical system drive unit 2, the image pickup element drive unit 4, the image height calculation unit 5, and the optical correction adjustment unit 12 and that functions as a central processing unit (CPU); and an optical DB 13 and a memory 15 connected to the system control unit 14, respectively. The optical DB 13 holds correction amounts of the peripheral light falloff, the magnification chromatic aberration, and the distortion (hereinafter simply referred to as "the correction amounts of various aberrations" or "the aberration correction amounts") calculated in advance from the image height and the optical parameters, for each optical parameter. The system control unit 14 controls the optical system drive unit 2, the image pickup element drive unit 4, the image height calculation unit 5, and the optical correction adjustment unit 12.

The optical correction adjustment unit 12 determines which correction unit should execute the aberration correction processes, based on "a time period required for the aberration correction processes" calculated in advance and "a time period assigned for the aberration correction processes" obtained from the system control unit 14. The optical correction adjustment unit 12 outputs a notification flag, which indicates which correction unit should be operated, to the system control unit 14. In accordance with the notification flag output from the optical correction adjustment unit 12, the system control unit 14 selectively reads out correction amounts of the peripheral light falloff, the magnification chromatic aberration, and the distortion according to the then optical parameters from the optical DB 13 and outputs the correction amounts to the optical correction adjustment unit 12 along with the optical parameters. Moreover, if correction amounts of various aberrations according to the then optical parameters are not stored in the memory 15, the system control unit 14 reads out the neighborhood correction amounts. The memory 15 holds a past history of operation flags output by the optical correction adjustment unit 12 to the respective correction control units.

The optical correction adjustment unit 12 receives the then optical parameters and the correction amounts of various aberrations according to the then optical parameters from the system control unit 14 and outputs an operation flag ON signal, of indicating that the correction unit should be operated, the then optical parameters, and the aberration correction amounts to the correction control unit.

It should be noted that although the correction units, the correction control units, and the optical correction adjustment unit 12 are described as separate circuits in the present embodiment, these units may be integrated on one chip.

A description will now be given of an image pickup operation of the image pickup apparatus of FIG. 1.

In the image pickup apparatus of FIG. 1, the optical system 1 drives the aperture and the lenses based on control signals from the system control unit 14 to form a subject image set at appropriate brightness on the image pickup element 3. The image pickup element 3 is driven by a drive pulse controlled by the system control unit 14 and converts the subject image to electrical signals due to the photoelectric conversion to output the subject image as image signals. The image pickup element 3 executes the output process of the image signal at a predetermined frame rate to output continuous image signals as video images.

The image height calculation unit 5 receives the image signals and calculates an image height "hgt" using an expression shown for example in Expression (1) through the central processing unit (CPU) of the system control unit 14 based on a coordinate position of a target pixel and a coordinate position of the optical center axis of the lenses.

$$hgt = \{(xadr - Hc)^2 + (yadr - Vc)^2\}^{1/2} \quad (1)$$

Here, "xadr" denotes a coordinate in a horizontal direction of the target pixel, "yard" denotes a coordinate in a vertical direction of the target pixel, "Hc" denotes a coordinate in the horizontal direction of the optical center axis of the lenses, and "Vc" denotes a coordinate in the vertical direction of the center optical axis of the lenses.

The image height calculation unit 5 outputs the calculated image height "hgt" to the peripheral light falloff correction unit 6, the magnification chromatic aberration correction unit 8, and the distortion correction unit 10.

The light falloff correction control unit 7 does not operate when the operation flag from the optical correction adjustment unit 12 indicates OFF and outputs the light falloff correction amount to the peripheral light falloff correction unit 6 when the operation flag indicates ON and the light falloff correction amount according to the then optical parameters are read out. When the operation flag indicates ON and the neighborhood aberration correction amount is read out, the light falloff correction control unit 7 uses the neighborhood correction amount and the then optical parameters to generate an aberration correction amount by using the interpolation method.

The peripheral light falloff correction unit 6 uses the image height "hgt" received from the image height calculation unit 5 and the peripheral light falloff correction amount output from the light falloff correction control unit 7 to correct the peripheral light falloff.

The magnification chromatic aberration correction control unit 9 does not operate when the operation flag from the optical correction adjustment unit 12 indicates OFF and outputs the magnification chromatic aberration correction amount to the magnification chromatic aberration correction unit 8 when the operation flag indicates ON and the magnification chromatic aberration correction amount according to the then optical parameters is read out. When the operation flag indicates ON and the neighborhood aberration correction amount is read out, the magnification chromatic aberration correction control unit 9 uses the neighborhood correction amount and the then optical parameters to generate a magnification chromatic aberration correction amount by using the interpolation method.

The magnification chromatic aberration correction unit 8 uses the image height "hgt" received from the image height calculation unit 5 and the magnification chromatic aberration correction amount output from the magnification chromatic aberration correction control unit 9 to correct the magnification chromatic aberration.

The distortion correction control unit 11 does not operate when the operation flag from the optical correction adjustment unit 12 indicates OFF and outputs the distortion correction amount to the distortion correction unit 10 when the operation flag indicates ON and the distortion correction amount according to the current optical parameters is read out. When the operation flag indicates ON and the neighborhood distortion correction amount is read out, the distortion correction control unit 11 uses the neighborhood correction amount and the then optical parameters to generate a distortion correction amount by using the interpolation method.

The distortion correction unit 10 uses the image height "hgt" received from the image height calculation unit 5 and the distortion correction amount output from the distortion correction control unit 11 to correct the distortion.

Figure 2:
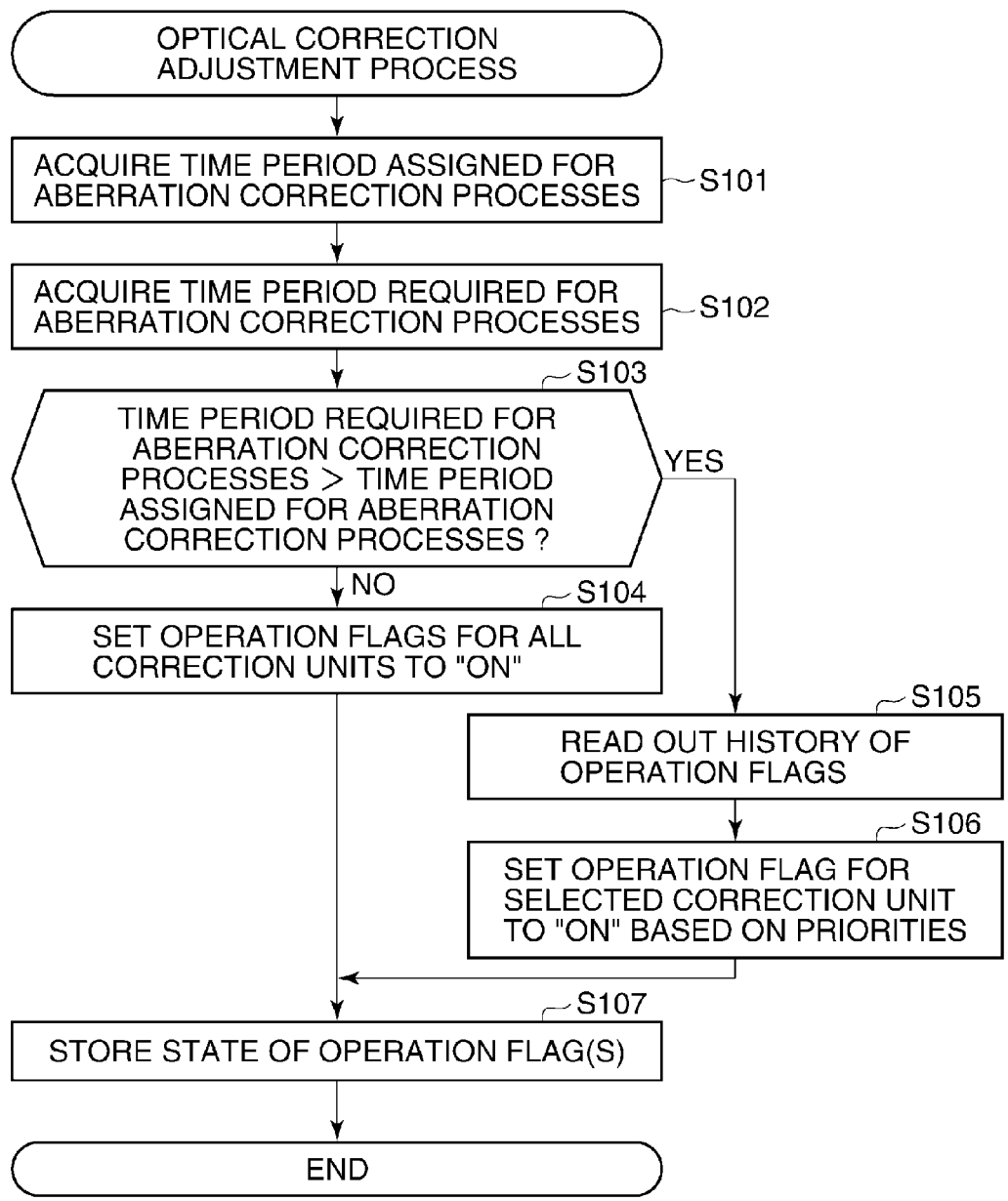
FIG. 2 A flowchart showing the procedure of an optical correction adjustment process executed by an optical correction adjustment unit in FIG. 1.

FIG. 2 is a flowchart showing the procedure of an optical correction adjustment process executed by the optical correction adjustment unit 12 in FIG. 1.

The process of FIG. 2 is executed by the optical correction adjustment unit 12 when the image pickup apparatus starts the image pickup operation of video images, to determine which correction unit of the light falloff correction unit 6, the magnification chromatic aberration correction unit 8, and the distortion correction unit 10 should be selectively operated.

In FIG. 2, the optical correction adjustment unit 12 first acquires the "time period assigned for the aberration correction processes" from the system control unit 14 (step S101). The system control unit 14 executes a calculation for controlling the optical system drive unit 2 and the image pickup element drive unit 4 as necessary to set suitable states for the luminance of the image and the focus while performing the image pickup operation. Therefore, the time period assigned for the system control unit 14 to read out the correction amounts of various aberrations from the optical DB 13 changes according to the time period required to control the optical system drive unit 2 and the image pickup element drive unit 4.

Next, the optical correction adjustment unit 12 acquires the time period required for the aberration correction processes (step S102). Specifically, the optical correction adjustment unit 12 acquires a time period required for the system control unit 14 to read out all correction amounts of various aberrations necessary for the aberration correction processes from the optical DB 13 and subsequently transmit the correction amounts to the optical correction adjustment unit 12. It is assumed that the time period is calculated in advance. The system control unit 14 reads out, whenever the optical system drive unit 2 driving the optical system 1 changes the optical parameters, the correction amounts of the peripheral light falloff, the magnification chromatic aberration, and the distortion according to the changed optical parameters from the optical DB 13.

Subsequently, the optical correction adjustment unit 12 compares the time period assigned for the aberration correction processes from the system control unit 14 with the time period required for the aberration correction processes to determine whether or not the time period required for the aberration correction processes is longer than the time period assigned for the aberration correction processes (step S103).

As a result of the determination of the step S103, when the time period required for the aberration correction processes is not longer than the time period assigned for the aberration correction processes (NO to the step S103), the optical correction adjustment unit 12 determines that there is no need to set priorities to the aberration correction processes, thereby making all the aberration correction processes available, and outputs a notification flag, of indicating all the aberration correction processes should be executed (setting the operation flags for all the correction units to "ON"), to the system control unit 14 (step S104). At this point, the system control unit 14 reads out the correction amounts of the light falloff, the magnification chromatic aberration, and the distortion according to the then optical parameters from the optical DB 13 and outputs these correction amounts to the optical correction adjustment unit 12 along with the optical parameters, and the optical correction adjustment unit 12 outputs the operation flag ON signal, the then optical parameters, and the correction amounts of various aberrations to all the correction control units.

Subsequently, the system control unit 14 stores the states (ON/OFF) of the operation flags for all the correction units in the memory 15 (step S107), followed by the process terminating.

As a result of the determination of the step S103, when the time period required for the aberration correction processes is longer than the time period assigned for the aberration correction processes (YES to the step S103), the optical correction adjustment unit 12 determines that there is a need to set priorities to the aberration correction processes, and reads out the history of the operation flags stored in the memory 15 to set the priorities to the aberration correction processes (step S105).

In the step S105, the priorities of the aberration correction processes is predetermined in the order of the peripheral light falloff correction, the magnification chromatic aberration correction, and the distortion correction are repeated, for example. This enables all the aberration correction processes to be surely executed in the sequential order. For example, when the peripheral light falloff correction process is executed the last time, the magnification chromatic aberration correction is implemented this time, and the distortion chromatic aberration correction process should be executed the next time. It should be noted that if the operation flags for all the correction units indicate "ON" the last time, a default order is set.

Next, the optical correction adjustment unit 12 refers to the operation flag of the last time to determine the priorities of the aberration correction processes, selects the aberration correction process to be executed based on the determined priorities of the aberration correction processes, and outputs a notification flag, of indicating the selected aberration correction process (setting the operation flags for the selected correction unit to "ON"), to the system control unit 14 (step S106).

In the step S106, the system control unit 14 further reads out the aberration correction amount in the selected aberration correction process according to the then optical parameters from the optical DB 13 and outputs the aberration correction amount to the optical correction adjustment unit 12 along with the optical parameters. The optical correction adjustment unit 12 then outputs the operation flag ON signal, the then optical parameters, and the aberration correction amount to the corresponding correction control unit.

Subsequently, the state (ON/OFF) of the operation flag for the correction unit selected based on the priorities is stored in the memory 15 (step S107), followed by the process terminating.

According to the process of FIG. 2, the correction unit that executes the aberration correction process is selected based on the time period required for the aberration correction processes and the time period assigned for the aberration correction processes output from the system control unit 14. This prevents a situation from being unchanged in which only a part of the optical correction processes is executed and the other optical correction processes are not executed, which enables the aberration corrections to be effectively performed.

Figure 3:
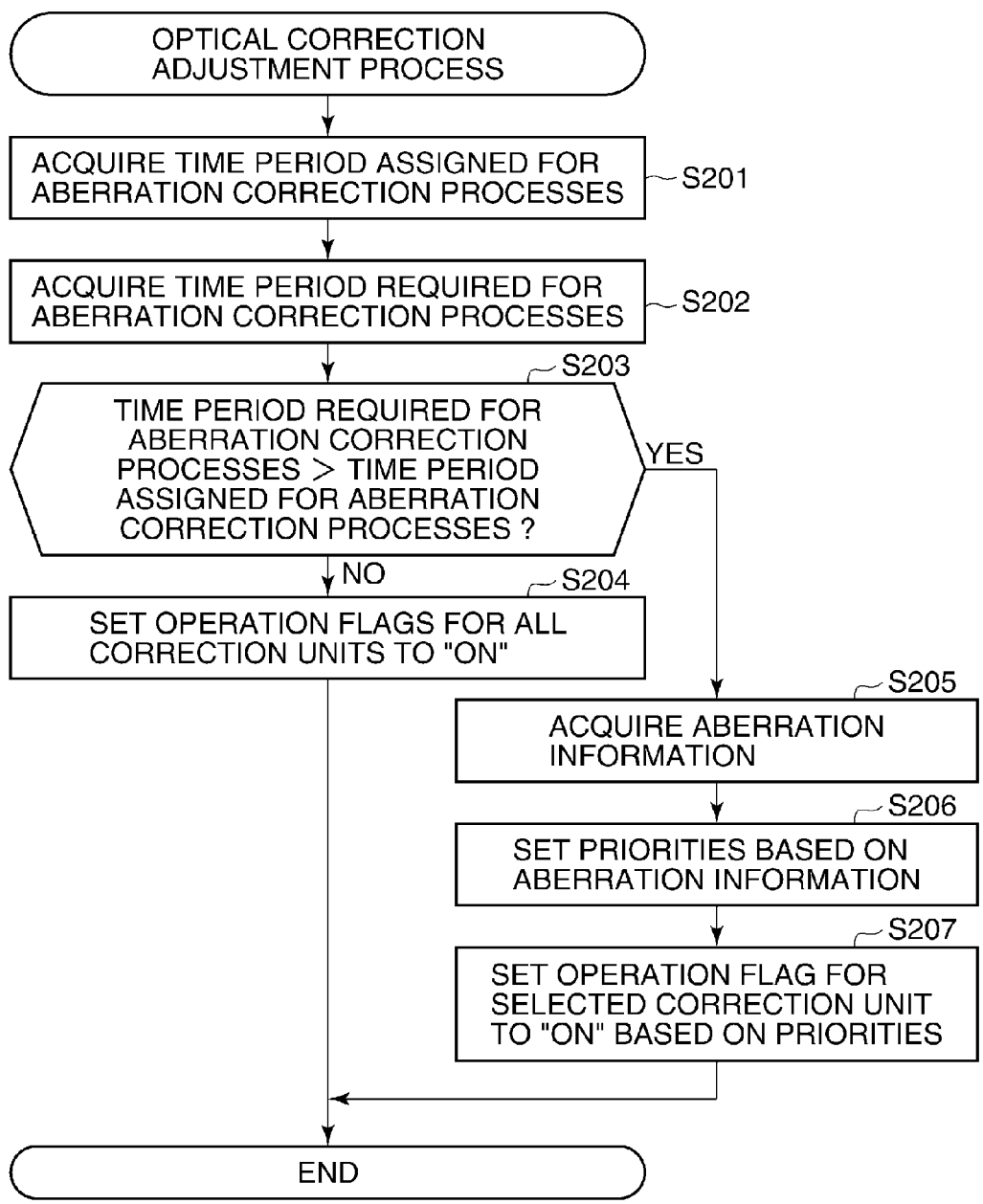
FIG. 3 A flowchart showing a procedure of a modified example of the optical correction adjustment process of FIG. 2.

FIG. 3 is a flowchart showing the procedure of a modified example of the optical correction adjustment process of FIG. 2.

The process of FIG. 3 is different from the process of FIG. 2 in that the optical correction adjustment unit 12 acquires aberration information of the optical system from the system control unit 14 and determines the priorities with the sizes of the aberrations taken into account.

The process of FIG. 3 is executed by the optical correction adjustment unit 12 when the image pickup apparatus starts the image pickup operation of video images, to determine which correction unit of the light falloff correction unit 6, the magnification chromatic aberration correction unit 8, and the distortion correction unit 10 should be selectively operated.

In FIG. 3, the optical correction adjustment unit 12 first acquires the "the time period assigned for the aberration correction processes" from the system control unit 14 (step S201) and acquires the "the time period required for the aberration correction processes" (step S202).

Subsequently, the optical correction adjustment unit 12 compares the time period assigned for the aberration correction processes from the system control unit 14 with the time period required for the aberration correction processes to determine whether or not the time period required for the aberration correction processes is longer than the time period assigned for the aberration correction processes (step S203).

As a result of the determination of the step S203, when the time period required for the aberration correction processes is not longer than the time period assigned for the aberration correction processes (NO to the step S203), the optical correction adjustment unit 12 determines that there is no need to set priorities to the aberration correction processes, thereby making the aberration correction process available, and outputs a notification flag, of indicating that all aberration correction processes should be executed (setting the operation flags for all the correction units to "ON"), to the system control unit 14 (step S204), followed by the process terminating.

In the step S204, the system control unit 14 reads out the correction amounts of the light falloff, the magnification chromatic aberration, and the distortion according to the then optical parameters from the optical DB 13 and outputs these correction amounts to the optical correction adjustment unit 12 along with the optical parameters, and the optical correction adjustment unit 12 outputs the operation flag ON signal, the then optical parameters, and the correction amounts of various aberrations to all the correction control units.

As a result of the determination of the step S203, when the time period required for the aberration correction processes is longer than the time period assigned for the aberration correction processes (YES to the step S203), the optical correction adjustment unit 12 determines that there is a need to set priorities to the aberration correction processes, and acquires information of various aberrations according to the then optical parameters from the system control unit 14 (step S205).

Next, the optical correction adjustment unit 12 refers to a table of FIG. 4 to set priorities corresponding to the acquired information of various aberrations and the sizes of various aberrations (step S206).

The table of FIG. 4 shows the sizes of various aberrations with respect to the light falloff, the magnification chromatic aberration, and the distortion, with the priorities shown in parentheses. Priority Nos. in the table of FIG. 4 allocated to classify all combinations of the optical parameters, for example, they are allocated for every combination of respective drive amounts of the zoom lens, the focus lens, and the aperture. More specifically, the sizes of various aberrations are shown for every discrete drive position of the optical system. It should be noted that specific correction amounts may be shown instead of the information showing the sizes of the aberrations.

The more aberration correction process is required, the larger the sizes of various aberrations. The table of FIG. 4 shows that, for example, in priority No. 22, the priority of the peripheral light falloff is the first, the priority of the magnification chromatic aberration is the second, and the priority of the distortion is the third.

In the table of FIG. 4, if the levels of requiring the aberration correction processes are the same, the greater are the correction errors when the aberration correction processes are not executed because of low priorities, the higher the priorities of aberrations are set.

Returning to FIG. 3, the optical correction adjustment unit 12 selects the aberration correction process to be executed based on the determined priorities of the aberration correction processes and outputs a notification flag indicating the selected aberration correction process to the system control unit 14 (setting the operation flags for the selected correction unit to "ON") (step S207), followed by the process terminating.

In the step S207, the system control unit 14 further reads out the aberration correction amount in the selected aberration correction process according to the then optical parameters from the optical DB 13 and outputs the correction amount to the optical correction adjustment unit 12 along with the then optical parameters. The optical correction adjustment unit 12 then outputs the operation flag ON, the then optical parameters, and the aberration correction amount to the corresponding correction control unit.

According to the process of FIG. 3, the optical parameters are acquired, and the priorities of the correction units that execute the aberration correction processes are determined by taking the sizes of various aberrations into account. As a result, the aberration correction processes can be efficiently executed even if the optical parameters are changed.

Figure 5:
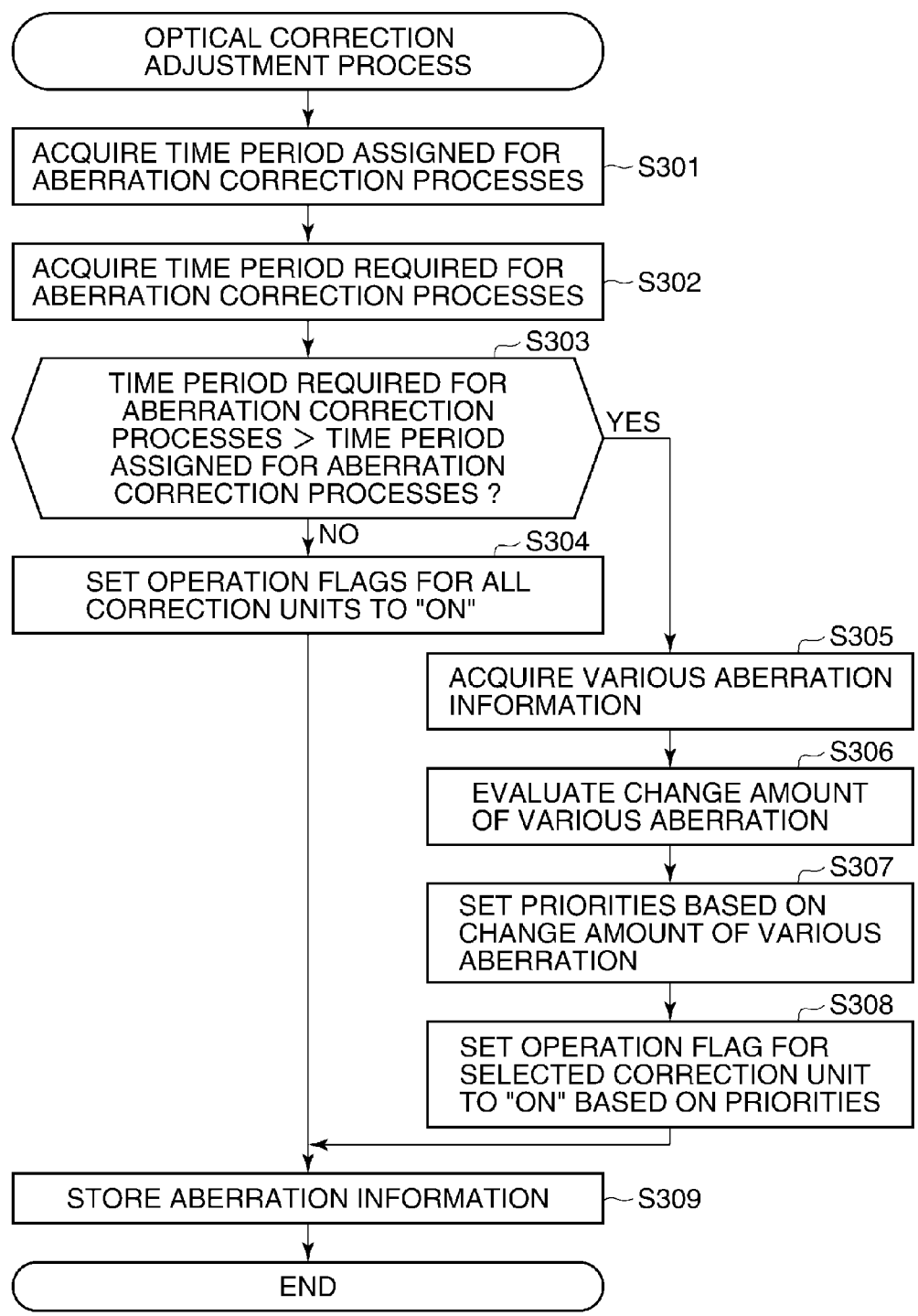
FIG. 5 A flowchart showing the procedure of another modified example of the optical correction adjustment process of FIG. 2.

FIG. 5 is a flowchart showing the procedure of another modified example of the optical correction adjustment process of FIG. 2.

The process of FIG. 5 is different from the processes of FIGS. 2 and 3 in that the optical correction adjustment unit 12 acquires aberration information of the optical system from the system control unit 14 and determines the priorities by taking change amounts of various aberrations into account.

The process of FIG. 5 is executed by the optical correction adjustment unit 12 when the image pickup apparatus starts the image pickup operation of video images, to determine which correction unit of the light falloff correction unit 6, the magnification chromatic aberration correction unit 8, and the distortion correction unit 10 should be selectively operated.

In FIG. 5, the optical correction adjustment unit 12 first acquires the "the time period assigned for the aberration correction processes" from the system control unit 14 (step S301) and acquires the "the time period required for the aberration correction processes" (step S302).

Subsequently, the optical correction adjustment unit 12 compares the time period assigned for the aberration correction processes from the system control unit 14 with the time period assigned for the aberration correction processes to determine whether or not the time period required for the aberration correction processes is longer than the time period assigned for the aberration correction processes (step S303).

As a result of the determination of the step S303, when the time period required for the aberration correction processes is not longer than the time period assigned for the aberration correction processes (NO to the step S303), the optical correction adjustment unit 12 determines that there is no need to set priorities to the aberration correction processes, thereby making all the aberration correction processes available and outputs a notification flag, of indicating that all the aberration correction processes should be executed (setting the operation flags for all the correction units to "ON"), to the system control unit 14 (step S304). At this point, the system control unit 14 reads out the correction amounts of the light falloff, the magnification chromatic aberration, and the distortion according to the then optical parameters from the optical DB 13 and outputs these correction amounts to the optical correction adjustment unit 12 along with the optical parameters, and the optical correction adjustment unit 12 also outputs the operation flag ON, the then optical parameters, and the correction amounts of various aberrations to all the correction control units.

Subsequently, the system control unit 14 stores aberration information related to correction targets of all the correction units in the memory 15 (step S309), followed by the process terminating.

As a result of the determination of the step S303, when the time period required for the aberration correction processes is longer than the time period assigned for the aberration correction processes (YES to the step S303), the optical correction adjustment unit 12 determines that there is a need to set priorities to the aberration correction processes. Then the optical correction adjustment unit 12 acquires the aberration information of the optical system of the types corresponding to the then optical parameters from the system control unit 14 (step S305) and evaluates the change amounts of various aberrations based on the acquired aberration information (step S306).

The aberration information of the optical system acquired in the step S305 independently corresponds to each of the light falloff, the magnification chromatic aberration, and the distortion. More specifically, the aberration information showing the size of the aberration of the light falloff, the aberration information showing the size of the magnification chromatic aberration, and the aberration information showing the size of the distortion are independently set for one optical parameter. The optical correction adjustment unit 12 acquires the aberration information used last time for the aberration corrections from the memory 15 and acquires the respective aberration information in the current optical parameters from the optical DB 13. It should be noted that when the aberration information is acquired, all the information is acquired if there is enough time based on the determination from the information of the time period assigned for the aberration correction processes and the time period required for the aberration correction processes, and only information necessary to compare the change amounts among all the aberration information is selected and acquired if there is not enough time.

The optical correction adjustment unit 12 first performs, when evaluating the change amounts of various aberrations, a normalization process such that the information of different types of aberrations can be compared. In the normalization process, the effect of the aberration level on the image quality is evaluated in advance, and the amounts of aberration with the same level of effect is determined to have the same evaluation values.

In the step S306, the optical correction adjustment unit 12 obtains the temporal change amount between the normalized aberration information corrected last time and the current aberration information, for each of the light falloff, the magnification chromatic aberration, and the distortion aberration. It should be noted that the aberration information may be constituted by information showing specific correction amounts instead of the sizes of aberration, and differences between the correction amounts may be obtained.

Next, the optical correction adjustment unit 12 determines the priorities so that the aberrations with greater change amounts of change are ranked higher based on the differences between the correction amounts of the last time and the correction amounts this time on the basis of the change amounts of various aberrations (step S307).

Subsequently, the optical correction adjustment unit 12 selects the aberration correction process based on the determined priorities and outputs a notification flag indicating the selected aberration correction process to the system control unit 14 (setting the operation flags for the selected correction unit to "ON") (step S308). In the step S308, the system control unit 14 further reads out, from the optical DB 13, the aberration correction amount that is in the selected aberration correction process and that is of the type indicated by the notification flag according to the then optical parameters and outputs the correction amount to the optical correction adjustment unit 12 along with the then optical parameters. The optical correction adjustment unit 12 then outputs the operation flag ON signal, the then optical parameters, and the aberration correction amount to the correction control unit.

Next, the optical correction adjustment unit 12 transmits, to the system control unit 14, the aberration information related to the correction target of the correction unit selected based on the priorities determined in step S308, and the system control unit 14 stores the aberration information related to the correction target of the correction unit selected based on the priorities in the memory 15 (step S309), followed by the process terminating.

It should be noted that if the correction amounts are output to all the correction control units in the step S304, the optical correction adjustment unit 12 transmits the aberration information of all the aberrations to the system control unit 14, and the system control unit 14 stores the aberration information related to the correction targets of all the correction units in the memory 15. In this way, the aberration information related to the correction target is stored in the memory 15 at the end for each of the aberration correction processes; accordingly, the optical correction adjustment unit 12 can evaluate the change amount of aberration in the step S306.

According to the process of FIG. 5, the aberration information of the optical system is acquired, and the priorities are determined by taking the change amounts of various aberrations into account. As a result, the aberration correction processes can be efficiently executed even if the optical parameters are changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 6 peripheral light falloff correction unit
8 magnification chromatic aberration correction unit
10 distortion correction unit
12 optical correction adjustment unit
14 system control unit

The invention claimed is:

1. An image pickup apparatus comprising an optical system, the image pickup apparatus comprising:
a plurality of optical correction units that apply optical correction processes to a plurality of aberrations in the optical system, respectively;
a first acquisition unit that acquires a time period assigned for the optical correction processes;
a second acquisition unit that acquires a time period required for the optical correction processes;
a determination unit that determines whether or not the time period required for the optical correction processes is longer than the time period assigned for the optical correction processes;
a decision unit that decides priorities of the plurality of optical correction units if the time period required for the optical correction processes is longer than the time period assigned for the optical correction processes; and
an optical correction execution unit that causes the plurality of optical correction units to execute the optical correction processes according to the decided priorities.

2. The image pickup apparatus according to claim 1, wherein the priorities are a predetermined order.

3. The image pickup apparatus according to claim 1, further comprising a third acquisition unit that acquires aberration information of the optical system.

4. The image pickup apparatus according to claim 3, wherein the aberration information includes a size of an aberration of the optical system, and the greater the aberration is, the higher the priority of the optical correction process is.

5. The image pickup apparatus according to claim 3, wherein the aberration information includes a change amount of an aberration of the optical system, and the greater the change amount of the aberration is, the higher the priority of the optical correction process is.

6. The image pickup apparatus according to claim 3, wherein the aberration information of the optical system includes sizes of aberrations and aberration correction amounts at discrete positions of the optical system.

7. The image pickup apparatus according to claim 1, wherein the optical correction process includes at least one of a peripheral light falloff correction process, a magnification chromatic aberration correction process, and a distortion correction process.

8. The image pickup apparatus according to claim 1, wherein the optical correction execution unit causes the plurality of optical correction units to execute the optical correction processes if the time period required for the optical correction processes is not longer than the time period assigned for the optical correction processes.

9. A control method of an image pickup apparatus comprising an optical system, the control method comprising:
a plurality of optical correction steps of applying optical correction processes to a plurality of aberrations in the optical system, respectively;
a first acquisition step of acquiring a time period assigned for the optical correction processes;
a second acquisition step of acquiring a time period required for the optical correction processes;
a determination step of determining whether or not the time period required for the optical correction processes is longer than the time period assigned for the optical correction processes;
a decision step of deciding priorities of the plurality of optical correction steps if the time period required for the optical correction processes is longer than the time period assigned for the optical correction processes; and
an optical correction execution step of causing the optical correction processes to be executed in the plurality of optical correction steps according to the decided priorities.

* * * * *